INVENTORS
WILLIAM G. LEWIS
CLYDE R. MAYO
BERNARD J. WOLFE
BY Harold E. Stonebraker
ATTORNEY Dec. 17, 1957     W. G. LEWIS ET AL     2,816,493
ELECTROPHOTOGRAPHIC MICROFILM ENLARGER
Filed March 19, 1953     11 Sheets-Sheet 7

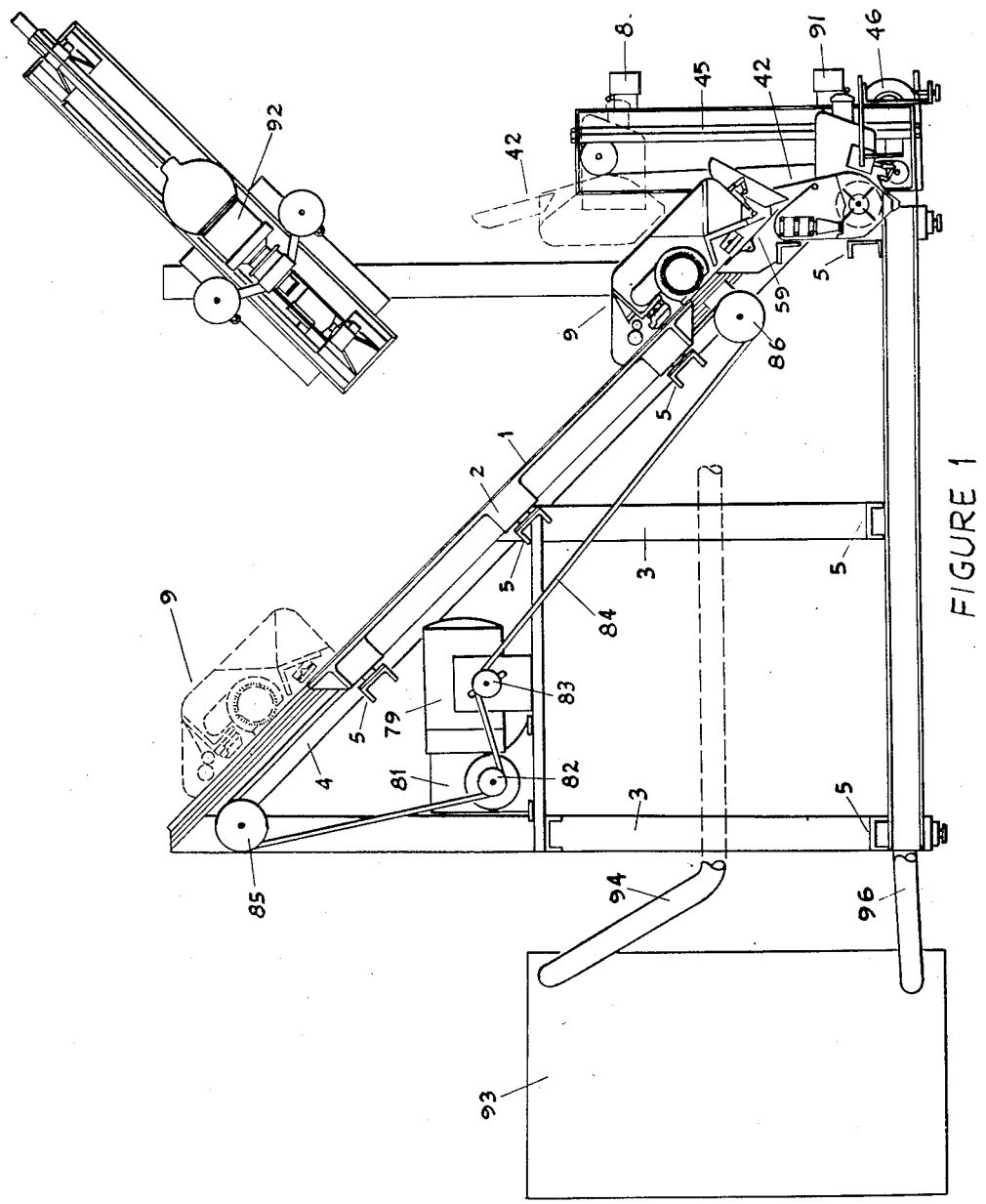

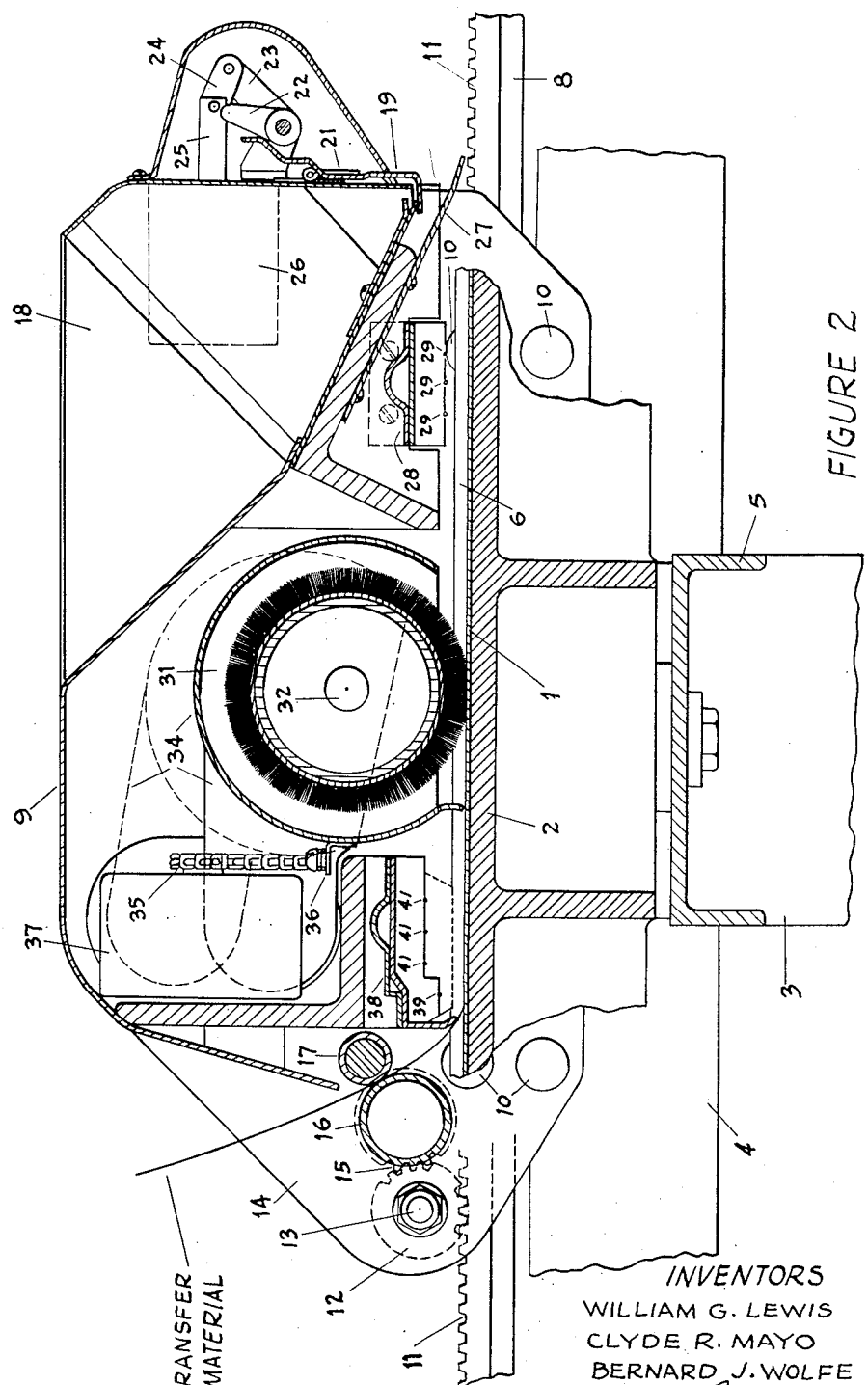

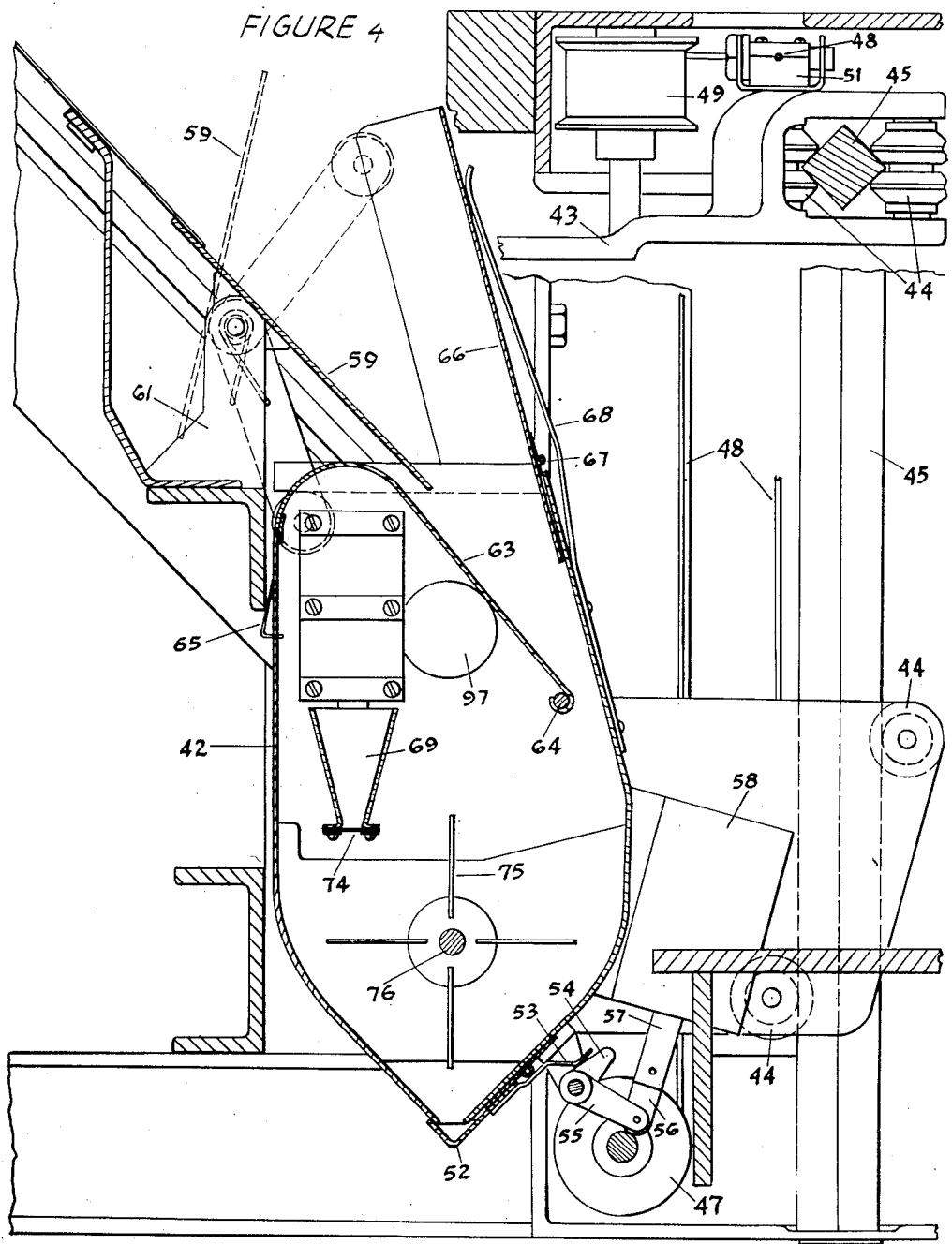

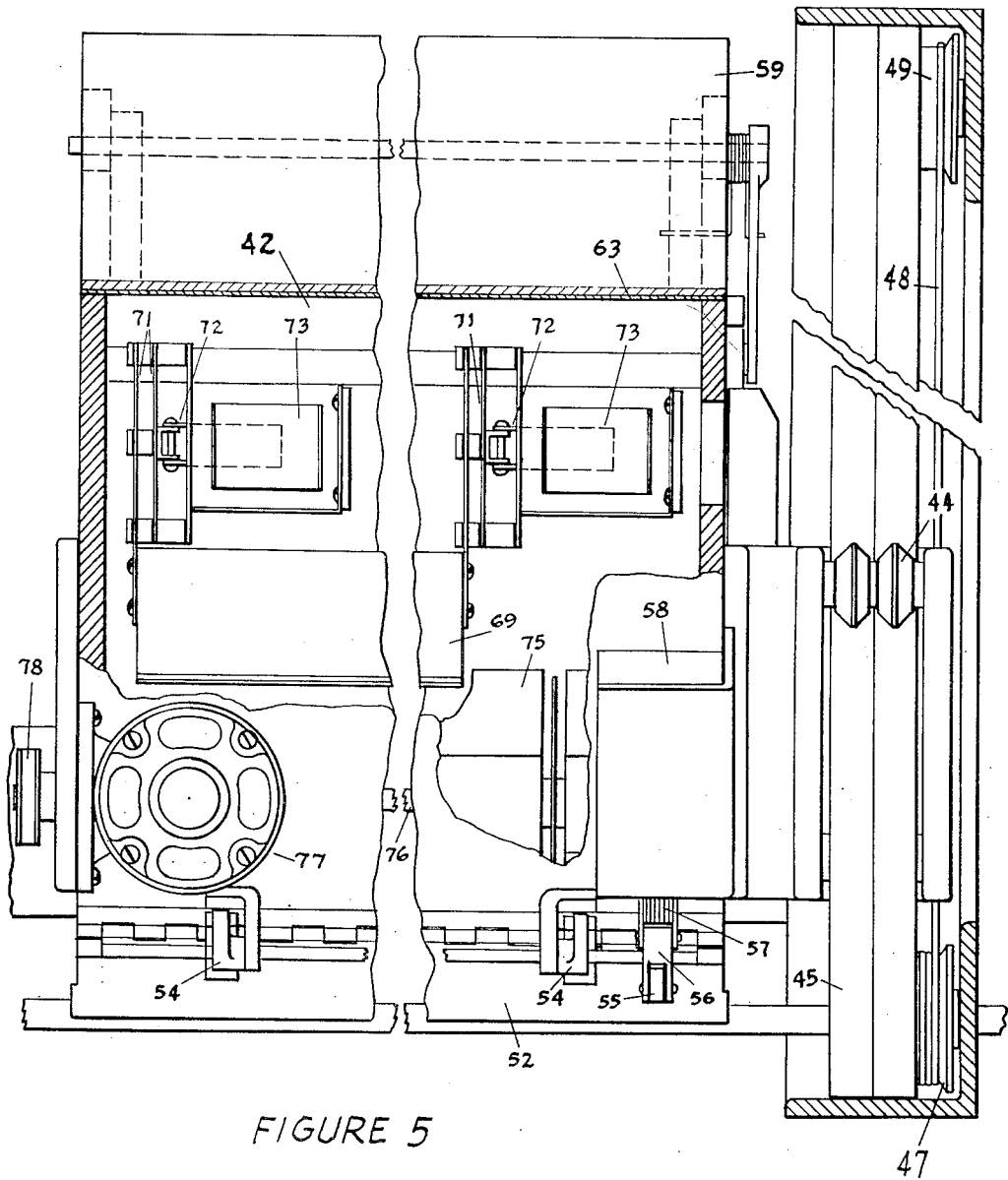

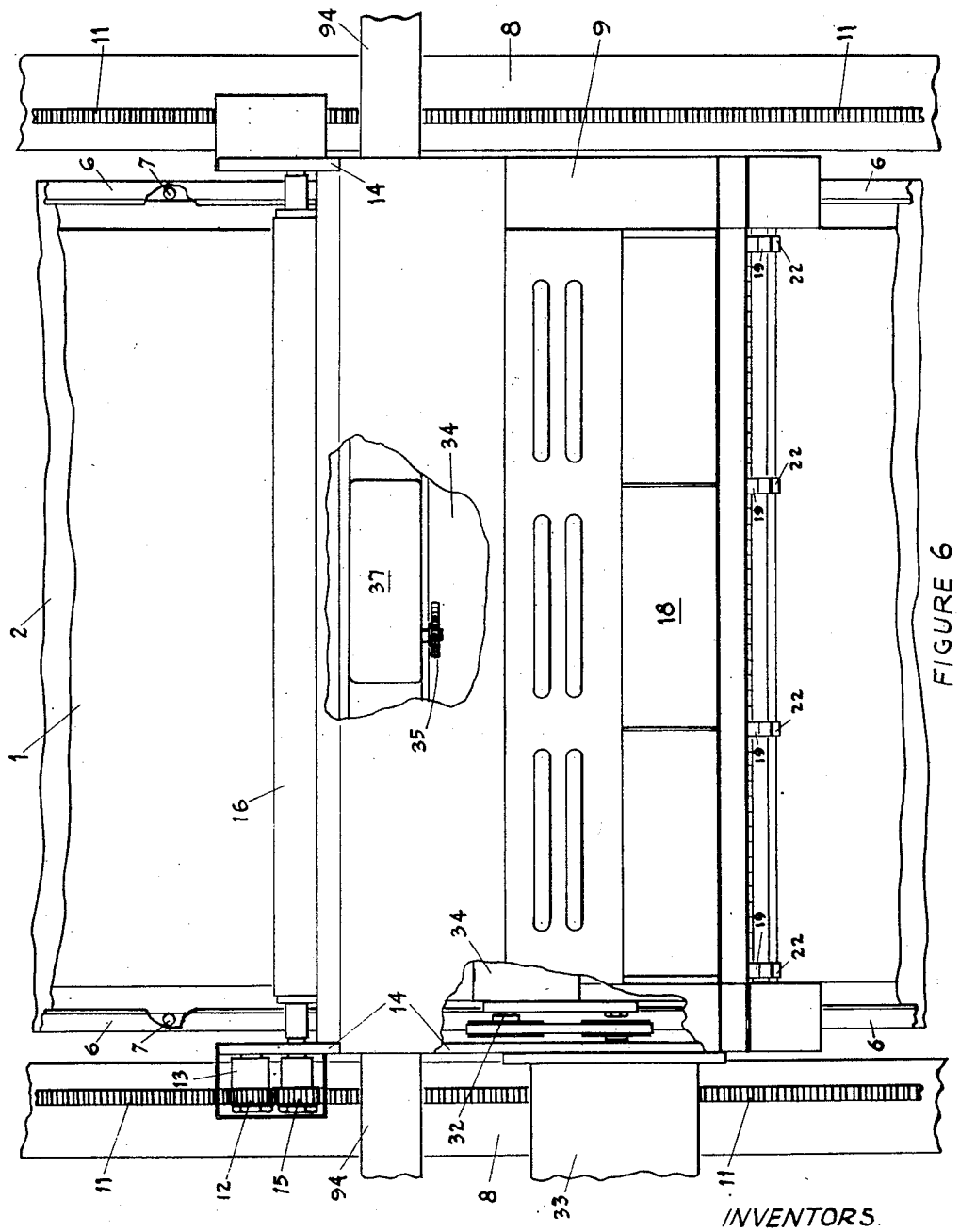

INVENTORS
WILLIAM G. LEWIS
CLYDE R. MAYO
BERNARD J. WOLFE
BY Harold E. Stonebraker
ATTORNEY Dec. 17, 1957     W. G. LEWIS ET AL     2,816,493
ELECTROPHOTOGRAPHIC MICROFILM ENLARGER
Filed March 19, 1953     11 Sheets-Sheet 8

INVENTORS
WILLIAM G. LEWIS
CLYDE R. MAYO
BERNARD J. WOLFE
BY Harold E. Stonebraker
ATTORNEY Dec. 17, 1957   W. G. LEWIS ET AL   2,816,493
ELECTROPHOTOGRAPHIC MICROFILM ENLARGER
Filed March 19, 1953   11 Sheets-Sheet 9
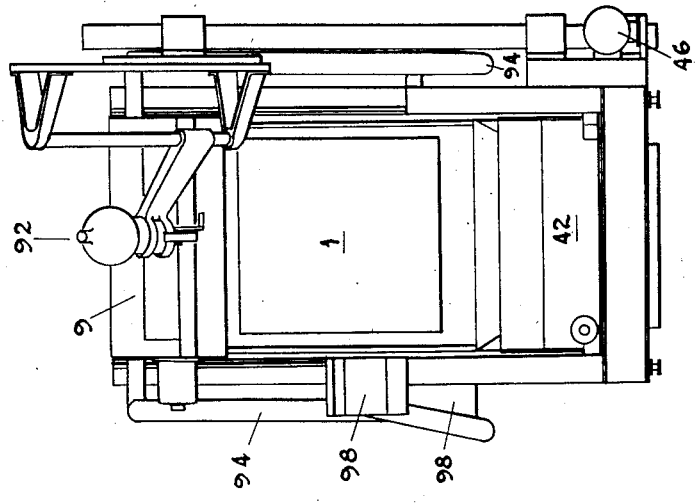
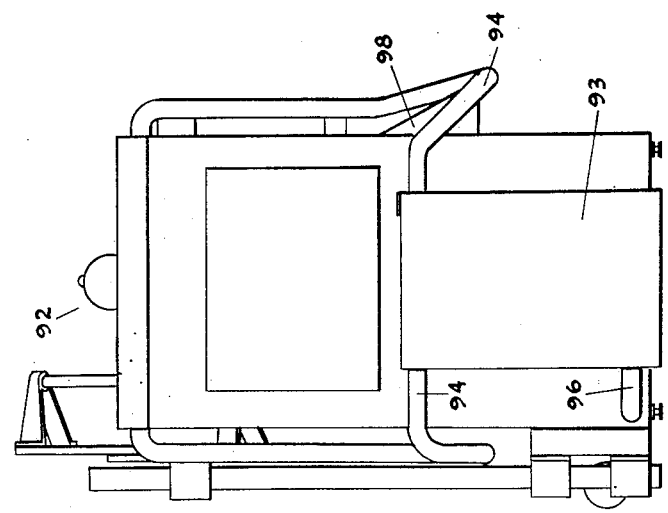
INVENTORS
WILLIAM G. LEWIS
CLYDE R. MAYO
BERNARD J. WOLFE
BY Harold E. Stonebraker
ATTORNEY Dec. 17, 1957 W. G. LEWIS ET AL 2,816,493
ELECTROPHOTOGRAPHIC MICROFILM ENLARGER
Filed March 19, 1953 11 Sheets-Sheet 11

INVENTORS
WILLIAM G. LEWIS
CLYDE R. MAYO
BERNARD J. WOLFE
BY Harold E. Stonebraker
ATTORNEY +# United States Patent Office 2,816,493
Patented Dec. 17, 1957

2,816,493

ELECTROPHOTOGRAPHIC MICROFILM ENLARGER

William G. Lewis, Clyde R. Mayo, and Bernard J. Wolfe, Rochester, N. Y., assignors to The Haloid Company, Rochester, N. Y., a corporation of New York Application March 19, 1953, Serial No. 343,332

22 Claims. (Cl. 95—1.7)

This invention relates to an electrophotographic microfilm enlarger and has for its purpose to afford apparatus with which enlargements to full size can be made quickly and readily from microfilm transparencies of machine drawings, maps, and other matter.

More particularly, the invention has to do with making enlarged copies from microfilm transparencies by an electrophotographic process which involves charging an electrophotographic plate electrostatically, projecting an enlarged light image onto the plate to produce an electrostatic image, developing the image by cascading developer powder over the plate, and transferring the powder image thus produced to a sheet of paper or other transfer material, and a further object is to provide mechanism for accomplishing the charging, image projecting, and developing functions automatically, requiring of the operator essentially only positioning of a microfilm frame in the machine and initiating the cycle of operations which are automatically effected, following which a sheet of paper can be placed in the machine and the powder image transferred from the electrophotographic plate to the paper.

The invention has for another object to employ a vertically inclined electrophotographic plate support with a traveling carriage mounted thereover and movable successively downwardly and upwardly to clean an electrophotographic plate during downward movement and charge the plate during the next upward movement, followed by exposure, and developing of the electrostatic image by cascading electroscopic powder over the plate during a succeeding downward movement of the carriage, the carriage being operated in conjunction with a catching hopper that is positioned above the carriage when the latter is in its lowermost position to supply developer from the catching hopper to a developer hopper on the carriage, and thereafter positioned beneath the lower end of the plate support to receive developer as it is cascaded over the plate during the downward developing travel of the carriage, these several operations and functions being performed automatically under the control of electrical mechanism that completes a cycle from an initial plate-cleaning operation to a final image-developing operation each time the stated cycle of movements is initiated by the operator.

The invention has for another purpose to provide a carriage movable downwardly and upwardly over an inclined plate support and provided with a powder developer hopper, transfer rolls, plate-charging mechanism, and a rotary plate-cleaning brush together with means for automatically effecting operation successively of the cleaning brush, the charging mechanism, and the dispensing of developer from the developer hopper during the successive downward, upward, and downward movements of the carriage, following which the powder image is transferred to a sheet of transfer material by operation of the transfer rolls during upward travel of the carriage under manual control of the operator.

Still another object of the invention is to provide a catching hopper that is automatically operable in conjunction with the carriage and movable upwardly while the carriage is in its uppermost position so that when the carriage reaches its bottom position after cleaning the plate, developer can be supplied to the developer hopper on the carriage from the catching hopper, and movable downwardly while the carriage is in its uppermost position to receive developer as the carriage moves downwardly and cascades developer over the plate, the catching hopper also being provided with a toner container located therein and operative to supply toner to the developer mixture as required, together with a stirring mechanism at the bottom of the catching hopper operating to mix the added toner with the powder in the catching hopper preparatory to its discharge into the developer hopper on the carriage.

The invention also has for a purpose to provide electrical mechanism operating automatically during each cycle to effect the plate-cleaning, powder-supplying, plate-charging, exposing, image-developing, toner-supplying and powder-stirring operations within the catching hopper, in succession, resulting in a finished powder image imposed on an electrophotographic plate which can be readily transferred by an operator to a suitable transfer sheet by inserting the sheet into transfer means on the carriage and effecting movement of the carriage upwardly to its initial or starting point.

To these and other ends, the invention consists in the construction and arrangement of parts that will appear clearly from the following description when read in conjunction with the accompanying drawings, the novel features being pointed out in the claims following the specification.

In the drawings:

Fig. 1 is a view in side elevation illustrating in full lines the position of the carriage at the limit of its downward movement and the catching hopper in position to receive developer as it is cascaded downwardly over a plate, and in dotted lines the position of the catching hopper when moved to its upper position and the carriage in its upper or initial position;

Fig. 2 is an enlarged longitudinal vertical sectional view taken centrally of the carriage and plate support, with parts broken away, showing the carriage and parts therein including the developer hopper, the cleaning brush, the charging grids, and the paper feed and transfer rolls;

Figure 7:
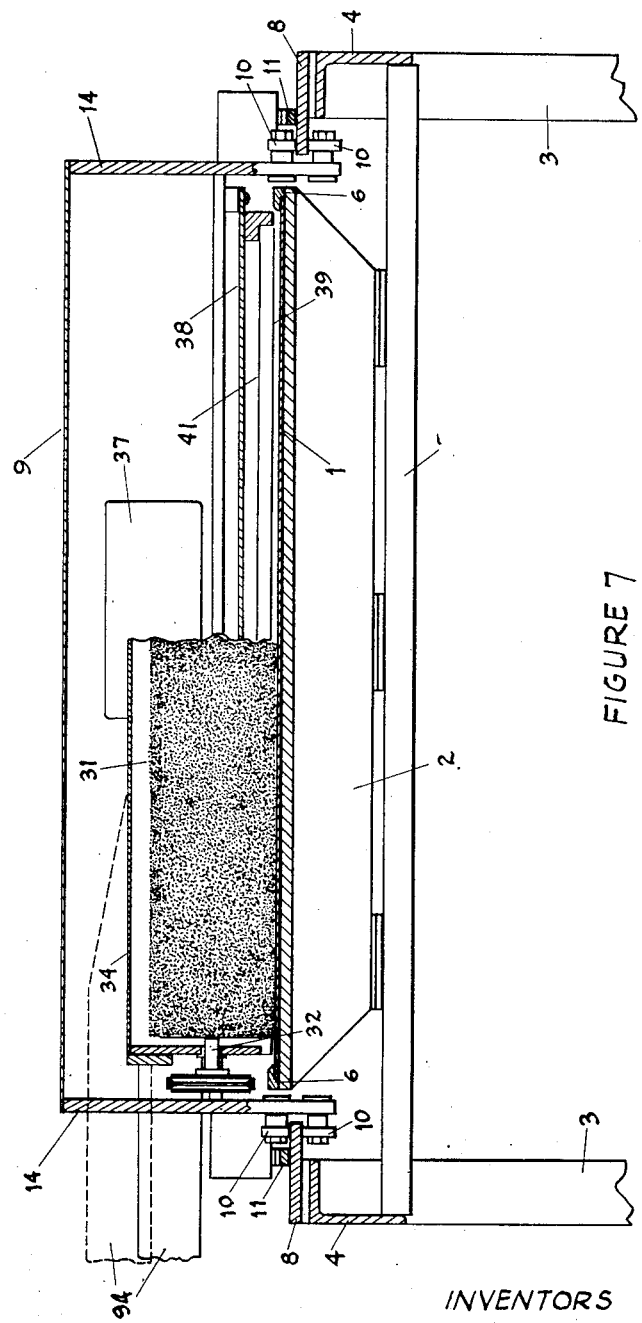
Figure 10:
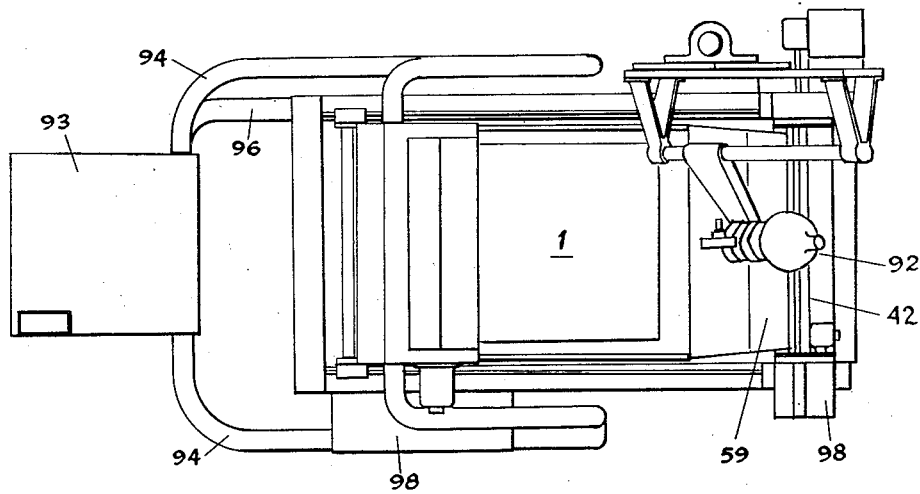
Figure 8:
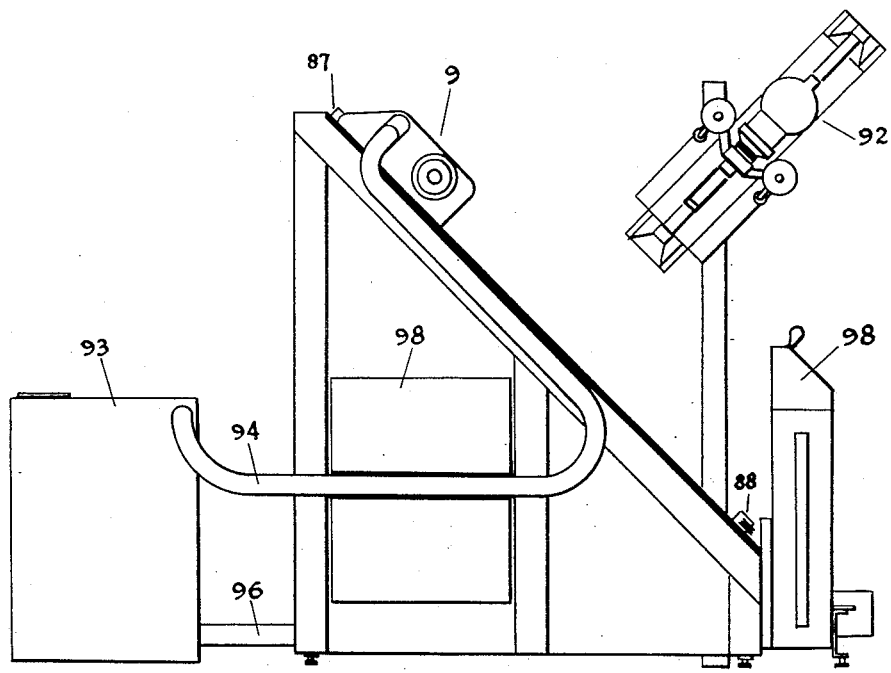
Figure 9:
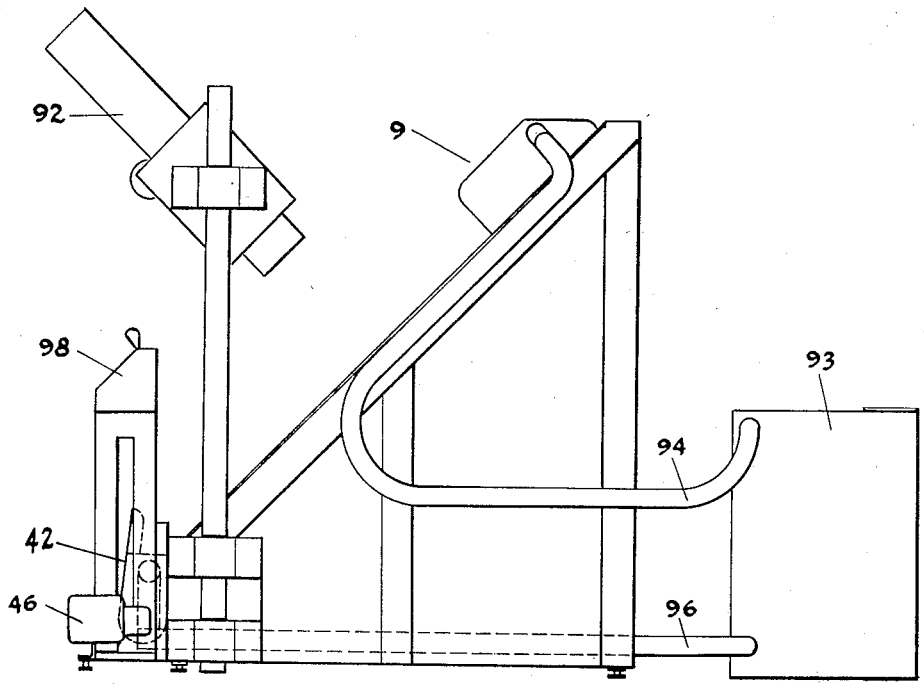
Figure 13:
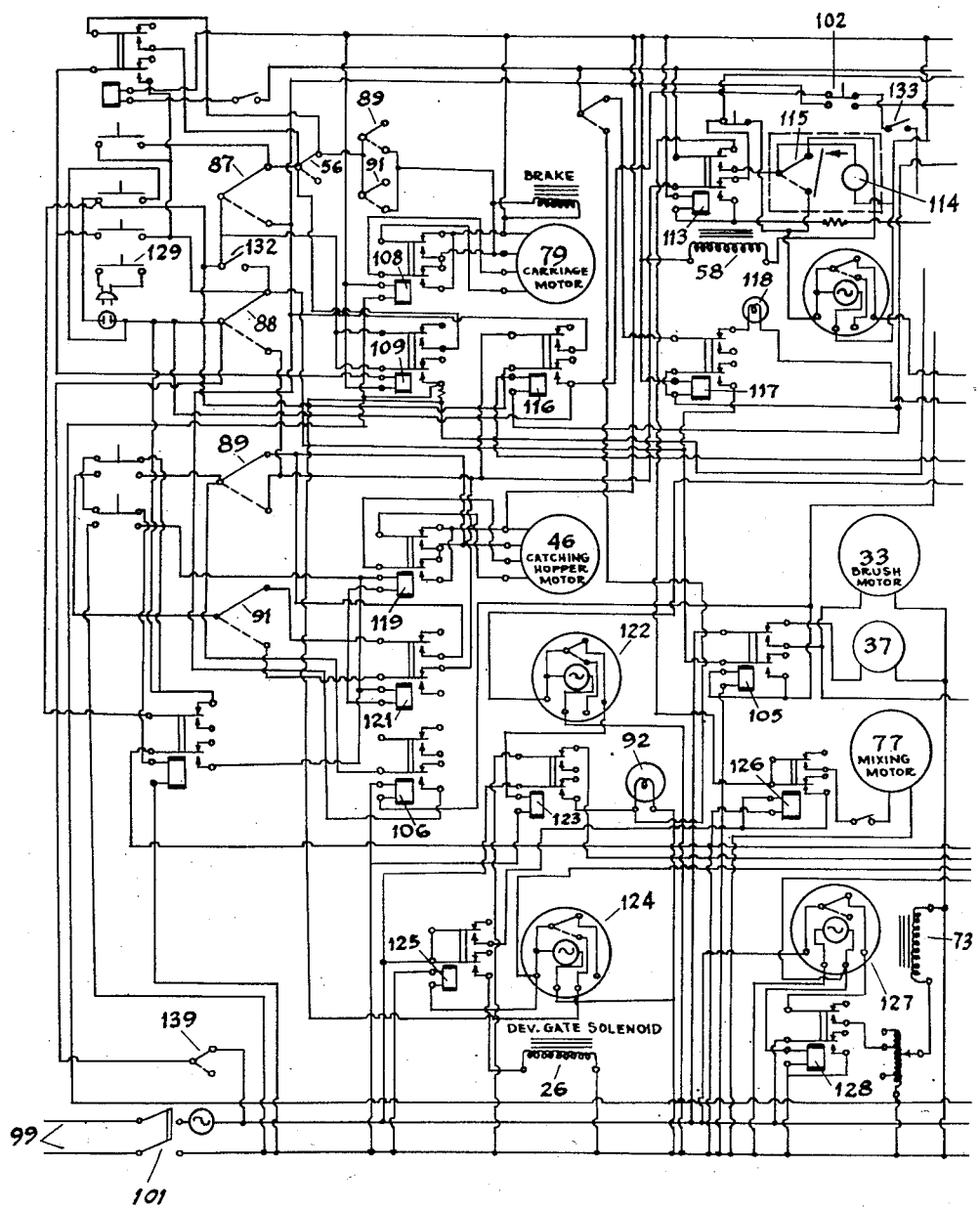
Figure 14:
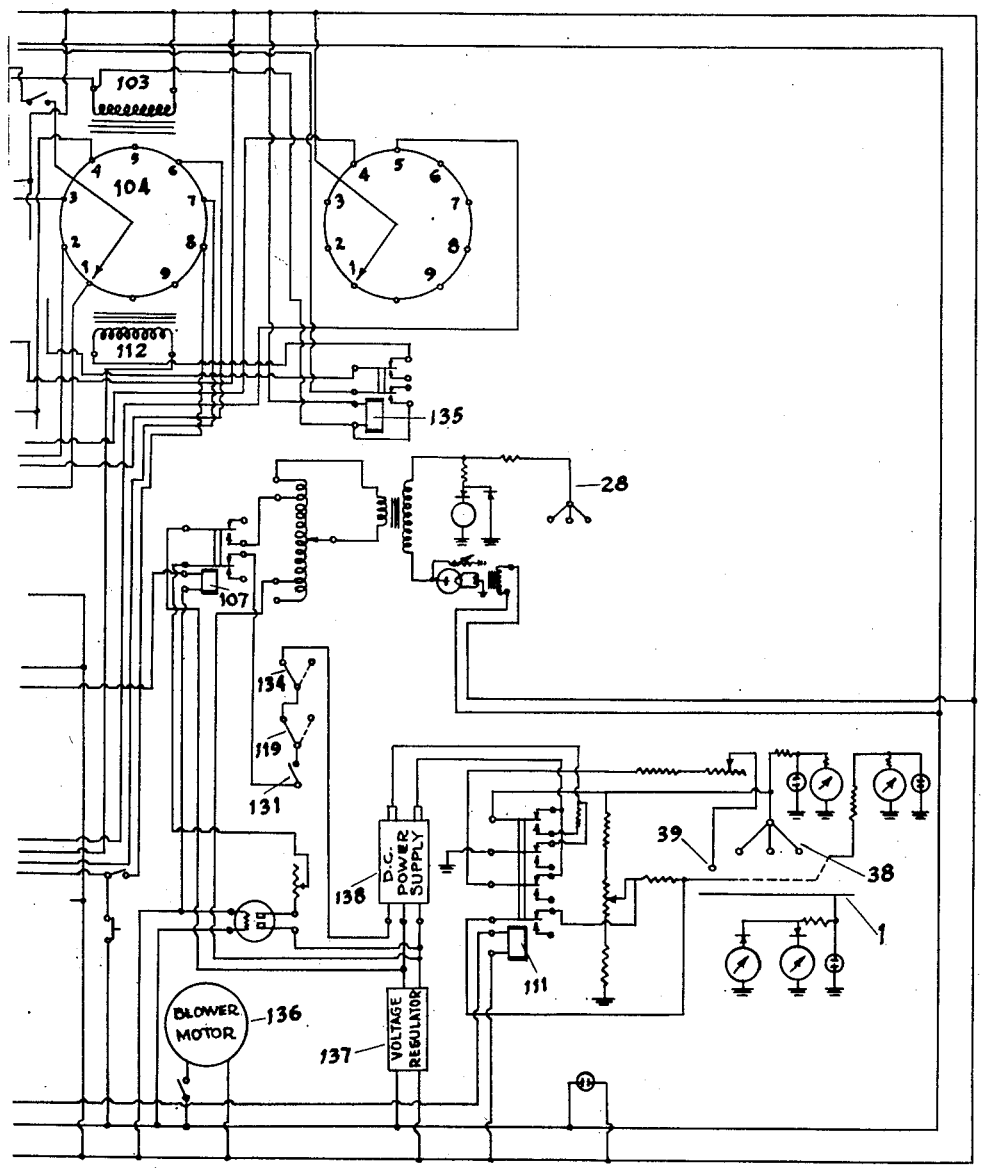

Fig. 3 is an enlarged vertical sectional view taken centrally through the catching hopper showing the hopper in its bottom position, the vibratory toner hopper and stirrer located within the catching hopper, and the powder guide plate appearing in full lines as when positioned to convey powder into the hopper and in dotted lines in the position which it assumes when the catching hopper is moved upwardly;

Fig. 4 is an enlarged horizontal sectional view showing a portion of the frame on which the catching hopper is mounted, the vertical rails on which the catching hopper travels upwardly and downwardly, and the drums which control movement of the cable that operates the hopper;

Fig. 5 is a vertical sectional view taken through the catching hopper;

Fig. 6 is a plan view of the carriage;

Fig. 7 is a transverse vertical sectional view through the plate support;

Fig. 8 is a view in side elevation illustrating the carriage at the top of its travel;

Fig. 9 is a view similar to Fig. 8 looking in the opposite direction;

Fig. 10 is a plan view;

Fig. 11 is an end elevation;

Fig. 12 is an end elevation looking in the opposite direction to Fig. 11;

Fig. 13 is a partial diagrammatic view of the electric controlling mechanism and circuits, and Fig. 14 is a diagrammatic view in continuation of Fig. 13, Figs. 13 and 14 taken together showing the complete diagram for electric control of the several operations.

The structure includes in general a photographic enlarger which projects an enlarged image of a microfilm on to an electrophotographic plate that is positionable on a vertically inclined plate support, and in operation a catching hopper moves to its top position and the carriage then moves downwardly over the electrophotographic plate to clean the same by means of a rotary brush mounted on the carriage. While at the bottom of its travel, developer is supplied from the catching hopper thereabove to a developer hopper on the carriage, following which the room light is extinguished and the carriage travels upwardly, charging the electrophotographic plate during such upward travel by means of charging mechanism mounted on the carriage. After the carriage reaches the limit of this upward movement, the catching hopper moves to its bottom position and the charged electrophotographic plate is thereafter exposed to the image for a predetermined period. The carriage then travels downwardly, cascading developer over the electrophotographic plate, the surplus developer which does not adhere to the electrostatic image on the plate to form a powder image being delivered into the catching hopper at the bottom of the plate support. When the developing operation has been completed, a toner dispenser and stirrer in the catching hopper are operated for a predetermined period to add and mix toner in the developer and this completes the automatic cycle. The powder image which at the end of the cycle is on the electrophotographic plate is then transferred by inserting a sheet of paper into the feed and transfer rolls mounted on the carriage and effecting upward movement of the carriage, causing the paper to be laid over the powder image in front of electrical charging means as the carriage travels upwardly, and when the carriage reaches the top of the plate support, the powder image will have been completely transferred to the transfer sheet which is then removed and the powder image affixed thereon by fusing in any convenient manner.

Referring more particularly to the drawings in which like reference numerals refer to the same parts throughout the several views, the electrophotographic plate that receives the microfilm image is designated at 1, see Fig. 2, and is positioned on a plate support 2 which is preferably constructed of aluminum and vertically inclined at an angle of 45° to the horizontal, as indicated in Fig. 1. The plate support 2 is mounted upon and insulated from a framework including uprights 3, inclined side rails 4, and transverse connecting elements 5, the plate being removably held in position against vertical movement on the support by means of clamping strips 6 extending along the side edges of the support 2, while 7 designates pins in the support which act to limit sidewise motion of the electrophotographic plate and enable positioning the same properly under the clamping strips 6. It is essential that electrophotographic plate be held perfectly flat to insure proper focusing and charging and to accomplish this, the aluminum plate support 2 is substantially ribbed and carefully machined both top and bottom.

At the sides of the support 2 are provided tracks 8, see Fig. 2, upon which is mounted for upward and downward travel a carriage designated generally at 9 and provided with rollers 10 arranged to travel on the tracks 8, and in order to insure uniform travel of the carriage in a straight line truly parallel to the long axis of the plate support at both sides, the tracks 8 are provided with toothed racks 11 at opposite sides of the support while 12 designates pinions engaging said racks 11 and mounted at the ends of a spindle 13 journalled in side walls 14 of the carriage. The pinions 12 also engage and drive pinions 15 mounted on a shaft which carries a feed and transfer roll 16 that is arranged at the upper end of the carriage and frictionally engages the feed and transfer roll spring 17 held yieldably thereagainst for feeding a transfer sheet into the carriage, as will be described hereinafter.

The roll 16 is preferably of metal with a high friction coating and roll 17 is rubber-coated and accurately ground to feed a paper sheet evenly and smoothly. Mounted upon the carriage 9 at its lower end is a developer hopper 18 which holds developer powder, consisting of granular carrier particles and fine electroscopic particles as known in the art, that is cascaded from the carriage over the electrostatic image on the electrophotographic plate to form a powder image thereon. The developer hopper 18 has a capacity of somewhat more than one charge of developer and an adjustable discharge outlet at its lower end that is controlled by a pivoted gate 19, held normally in closed position by a spring 21, and operated to open position at a predetermined point in the cycle of movement by the bellcrank 22 engaging spring 21 and connected by a linkage 23 and 24 to a plunger 25 of a solenoid 26 suitably mounted on one side wall of the carriage. 27 designates a deflector mounted beneath the outlet from the developer hopper and acting to discharge developer more nearly tangentially on to the electrophotographic plate resulting in finished images showing minimum background.

28 designates an A. C. grid including three corona discharge wires 29 mounted under the developer hopper on the carriage for the purpose of applying an A. C. corona discharge on to the electrophotographic plate to discharge the residual image on the plate under certain conditions and thus enable easier and more rapid cleaning when necessary to supplement the action of the normal cleaning unit which comprises a rotating cylindrical brush 31 approximately 5" in diameter and mounted upon a rotatable shaft 32 adapted to rotate at approximately 1700 R. P. M. during the cleaning cycle. The cleaning brush 31 consists preferably of rabbit fur or other material suitable for the purpose, mounted on a cylindrical core and adapted to be rotated by an electric motor 33 connected with the brush shaft by a suitable belt drive. The brush 31 and supporting shaft 32 are mounted in a brush housing 34 pivotally supported to swing about the axis of the motor shaft of motor 33, and provided with a chain 35 connecting lug 36 on the brush housing with the motor shaft of a motor 37 which is operated automatically at predetermined intervals to move the brush and brush housing from the full-line position shown in Fig. 2 in which the brush is engaged with the electrophotographic plate to the dotted-line position in which it is elevated above the plate during the time when the carriage is moving downwardly to develop the powder image, as will be described hereinafter.

The brush and brush housing are elevated about a center coincident with the center of the motor shaft which drives the brush, enabling the use of a belt drive to the brush shaft from the motor which is stationarily mounted on the carriage, the brush and housing being raised and lowered by the low power shaded pole motor 37 with reduction gear of such design that when energized, it elevates the brush and brush housing to the limit of its upward movement and then stalls with the power on without danger of overheating so that the brush may be raised or lowered by merely turning on or off the motor. When the motor 37 is turned off, the weight of the brush unwinds the motor shaft as the brush drops to its lowered position, the unwinding motor thus acting as a brake or governor on the lowering movement of the brush and easing its falling movement.

The A. C. grid referred to above including the corona wires 29 precedes the cleaning brush 31 during downward movement of the carriage, to clean the electrophotographic plate prior to the charging operation, the A. C. grid being employed only when desirable to discharge residual developer powder adhering to the plate, and for usual cleaning operations, the rotating brush 31 is sufficient and the electrical cleaning grid 28 is not used.

The charging grid which charges the electrophotographic plate during upward travel of the carriage and effects transfer of the powder image to a transfer sheet, is indicated generally at 38 and includes a single corona wire 39, followed by three screened corona wires 41, the charging grid 38 being a complete unit that is removably held in place on the carriage in any suitable fashion in the position illustrated in Fig. 2. The specific construction of the charging grid has been protected in another patent application and forms no part of the present invention, which contemplates the use of any suitable charging unit mounted on the carriage and effective to impose on the electrophotographic plate a uniform and evenly distributed electrostatic charge and produce a uniform potential on the surface of the plate during travel of the carriage thereover.

With the mechanism thus far described, the electrophotographic plate is cleaned during downward travel of the carriage and thereafter charged during upward travel of the carriage, developer being distributed from the developer hopper during the next downward movement of the carriage after exposure of the charged plate, and in order to return surplus developer to the developer hopper on the carriage after the development operation, mechanism is provided that automatically receives the excess developer as the latter is cascaded over the electrophotographic plate during downward travel of the carriage and returns such developer to the developer hopper when the carriage is in its lower position, all in the manner that will now be described, it being understood that fresh supplies of developer may be added to the developer hopper as required.

To accomplish these ends, there is provided a catching hopper 42, see Figs. 3 to 5 inclusive, that is supported on a horizontal frame 43 carrying guide rollers 44 that engage and are movable vertically on a vertical track 45. The catching hopper is movable upwardly and downwardly through the instrumentality of a reversing motor 46, see Fig. 1, which operates a drum 47, and 48 designates a cable extending around drum 47 and drum 49 at the top of the frame, the cable 48 being attached to the catching hopper frame 43 by means of a suitable clamp 51, see Fig. 4, and by this mechanism, the catching hopper is moved upwardly and downwardly at predetermined intervals by motor 46, which is operated automatically in proper relation to the movements of the carriage by the electrical control mechanism to be described hereinafter. The catching hopper 42 is provided with a discharge outlet normally closed by a gate 52 at the bottom and held in closed position by a spring 53 which is engaged and actuated by a bell-crank 54 connected by linkage 55 and 56 to the plunger 57 of the solenoid 58. Solenoid 58 is operated periodically to open and close the catching hopper at the bottom for the purpose of discharging developer into the developer hopper on the carriage when the carriage is in its lowermost position, as indicated in full lines in Fig. 1, and the catching hopper is in its upper position as indicated in dotted lines in Fig. 1, and when the gate 52 is closed and the catching hopper is in its lowermost position as shown in full lines in Fig. 1, it receives the developer during downward travel of the carriage from its upper dotted-line position of Fig. 1 to its lower full-line position while developing the powder image on the electrophotographic plate, during which operation the excess developer when it reaches the bottom of the plate is delivered into catching hopper 42. To facilitate this operation, there is provided a tilting guide plate 59 pivotally mounted on the supporting bracket 61, see Fig. 3, and normally in the full-line position in which it conveys developer from the electrophotographic plate into the catching hopper. The tilting plate 59 is retained in its full-line position by the catching hopper and is pivoted in such a way that when the catching hopper moves up, the tilting plate moves up out of the way, and when the catching hopper returns downwardly, it pulls the tilting plate to its normal position, as does the carriage also when it moves downwardly.

63 designates a cover for the catching hopper pivotally mounted at 64 and held in closed position by a spring catch 65, the cover 63 being releasable and movable to open position when desirable to place additional toner in the toner hopper, which will be described presently. 66 is a deflector pivoted in the catching hopper at 67 and positioned at an angle of about 30° to the direction of flow of developer over the plate, acting to intercept the developer with minimum impact and direct it into the catching hopper. The deflector 66 is held in normal position, see Fig. 3, by a spring 68 and yieldable against the spring 68 and out of the path of the carriage when the latter reaches the downward limit of its travel.

Developer powder is supplied to the developer hopper 18 on the carriage previously described, and during the developing operation and downward movement of the carriage, the developer powder is delivered into the catching hopper which is then located at the bottom of its movement as shown in full lines in Fig. 1 and in Fig. 3, the developer being subsequently released from the catching hopper and discharged into the developing hopper when the carriage is in the lower position as in full lines in Fig. 1 and the catching hopper is in its upper position as shown in dotted lines in Fig. 1. In order to maintain proper functioning of the developer, it becomes necessary at intervals to add additional toner powder to the developer which includes a mixture of toner or fine particles and granular carrier particles, in accordance with known practice in the art, and to accomplish this there is provided in the catching hopper a toner hopper 69 extending across the developer hopper, see Figs. 3 and 5, the toner hopper being mounted upon springs 71 that are connected to and oscillated by plungers 72 of solenoids 73 which are actuated automatically at given intervals to vibrate the toner hopper 69 and permit discharge of toner therefrom through a fine mesh screen bottom 74. The toner may be further agitated by small stones in the hopper 69, and is thereafter mixed with developer in the catching hopper by stirring devices 75 suitably mounted on a rotatable shaft 76 that is operated from a motor 77 through suitable gearing and a belt drive to pulley 78 on the shaft 76. The electrical control mechanism is so arranged that after the carriage reaches its lower position and the developing operation is completed, toner is automatically dispensed from the toner hopper 69 into the catching hopper and the stirring devices 75 at the same time operated to mix the toner thoroughly with the developer, following which the movements of the toner hopper and mixing devices are stopped and the cycle of automatic operations is complete. The powder image on the plate is then ready for transfer to a paper or other transfer sheet by operation of the feed and transfer rolls 16 and 17 between which the sheet is fed as the carriage is moved upwardly upon the operation of a manual switch to effect such upward travel of the carriage.

The carriage is moved upwardly and downwardly by means of a brake motor 79, see Fig. 1, with a reduction gear head 81 and motor drive sprocket 82 connected to the motor through a friction clutch in order to prevent damage to the motor in case the carriage is for any reason obstructed and jammed, while 83 designates an idler sprocket for adjusting tension in the chain 84 which rides over the motor driven sprocket 82 for operation thereby, around sprockets 85 and 86 at the ends of the plate support, and is suitably connected to the carriage. The motor 79 is of a reversible type and automatically controlled to effect the necessary upward and downward travel of the carriage on the inclined support, operation of the carriage motor 79 being governed by limit switches indicated diagrammatically at 87 and 88 at the top and bottom respectively of the inclined plate support, see Fig. 8, while 89 and 91 diagrammatically indicate limit switches at the top and bottom of the path of travel of the catching hopper for controlling movement of the reversible motor 46, see Fig. 1. Additional limit switches are provided at the top so that the carriage can be moved above the electrophotographic plate when changing plates and these also serve as emergency limit switches which function in event of failure of the regular controls.

The enlarger of any suitable type is indicated at 92 mounted upon a steel post or pedestal and satisfactory results have been obtained with an Eastman Recordak Model A, manufactured by Eastman Kodak Company, Rochester, New York, with a mirror positionable to intercept the light from the enlarger and project it on to a viewing screen, the mirror and screen not being shown since they form no part of the present invention and are utilized only to compose the image and insure its proper projection on to the electrophotographic plate. The enlarger light source is turned on and off by a timer during the automatic cycle and may be turned on manually for viewing and focusing the film.

It is essential with the construction described to provide suitable means for maintaining the cleaner brush 31 substantially free of dust and also to remove the dust-laden air from the zone of the catching hopper, and these objectives are attained by vacuum cleaning means and connections between the cleaner brush, the catching hopper, and the vacuum cleaning means as will now be described.

93 designates a vacuum cleaning unit with a large air capacity and filter system, connected by means of flexible pipes 94 with the brush housing 34, and at the same time any dust developing in the zone of the developer hopper on the carriage is removed as air is drawn into the carriage at the plate surface and thence into the brush surrounding hood. Excessive air velocity at the plate surface might affect the action of the falling developer particles, and to prevent this, openings are provided in the carriage housing above the brush hood, affording an additional entrance for air into the carriage, and lessening the air velocity at the plate surface. 96 designates a pipe leading from the vacuum cleaner unit 93 to a coupling adjacent to opening 97 in a side wall of the catching hopper and so arranged that when the catching hopper is in its lower position, the pipe 96 is in communication wtih opening 97 and operative to carry off any dust-laden air from the catching hopper when the developer is being cascaded downwardly over the electrophotographic plate into the catching hopper. When the catching hopper moves to its upper position, pipe 96 is disconnected since removal of dust-laden air from the catching hopper is required only when the latter is in its lowered position.

The operation of the machine briefly is as follows: The carriage on the support being in its top position and an electrophotographic plate clamped in position on the plate support, the film to be enlarged and copied is placed in the enlarger 92 and properly focused on to the electrophotographic plate. After the film is composed and the enlarger properly focused, the main power switch 101 is closed to permit warm-up of the power supply and start the vacuum in operation, after which the reset switch 102 is depressed, causing the catching hopper 42 to move to its top position, as shown in dotted lines in Fig. 1, the brush housing and brush being lowered to bring the brush 31 into contact with the electrophotographic plate, and the carriage moved downwardly over the plate for cleaning the latter, the A. C. grid at the forward end of the carriage being energized to assist in removing any residual charge from the powder on the plate. At the bottom of the travel of the carriage, the catching hopper discharges its developer into the developer hopper on the carriage, the brush and brush housing are elevated away from the electrophotographic plate, the plate-charging grid 38 is energized, the room lights are turned off, and the carriage is moved upwardly to charge the plate. When the carriage reaches the limit of its upward travel, the catching hopper moves down to its lower position, and the electrophotographic plate is exposed to the light image from the film for a predetermined length of time to impose an electrostatic image on the plate, after which the enlarger lights are turned off, the gate controlling the outlet on the developer hopper is opened to permit developer to be discharged from the developer hopper and to cascade downwardly over the electrophotographic plate, and the carriage starts its downward travel. During this downward travel of the carriage, the plate is regenerated by a negative potential on the screened portion of the charging grid 38, that is the wires 41, to prevent plate fatigue. The developer after cascading over the plate is received in the catching hopper which is then located at the bottom of its path of travel during the developing travel of the carriage. When the carriage reaches the limit of its downward movement, the toner hopper in the catching hopper is operated to discharge an additional supply of toner which is thereupon mixed with the developer in the catching hopper for a predetermined time, and the cycle of automatic operations is complete. Following this, the powder image which is then on the electrophotographic plate is transferred to a sheet of paper or other transfer material by inserting such sheet in between the rolls 16 and 17, see Fig. 2, and imparting upward movement to the carriage while at the same time energizing the charging grid 38. The diameter of roll 16 is slightly larger than necessary to give a surface speed equal to the carriage speed, thus causing the paper as it is fed in to bow slightly between the rolls and charging grid obviating buckling which would prevent good contact between the paper and the plate. The paper is fed against the plate at an angle of approximately 45° as it passes under the charging grid and over the powder image. An electrostatic charge is thus imposed on the upper surface of the transfer sheet, and the powder image is transferred from the plate to the sheet of paper or other material. When the carriage reaches its top position, the transfer sheet can be peeled manually from the electrophotographic plate and the powder image affixed thereto by fusing or in any other convenient fashion.

There are two high voltage supplies, one of direct current for charging the plate, transferring the image, and regenerating the plate. A high voltage relay is employed to reverse the polarity and give the negative potential for regenerating the electrophotographic plate, and a second supply unit furnishes high voltage A. C. current for plate cleaning when required by developer residue adhering to the plate. The automatic operation of the various parts as described above is brought about by electrical controlling means indicated diagrammatically in Figs. 13 and 14, Fig. 14 being a continuation of the diagram indicated in Fig. 13. The control switches to the several electrical units are arranged in a control box indicated at 98, the details of the electrical mechanism not being shown inasmuch as the various electrical units are of conventional construction and form no part of the invention except insofar as they combine to effect the necessary movements and operation of the various parts hereinbefore described and necessary to bring about cleaning and charging of an electrophotographic plate, exposure of the plate to an image enlarged from a microfilm, and development of the image on the plate, and transfer of the powder image from the plate to a sheet of transfer material.

Referring to Figs. 13 and 14, 99 designates a controlling 115 volt A. C. circuit while 101 is the main switch for opening and closing the controlling circuit. To start the cycle, the reset switch 102 is depressed after first closing switch 101, and the operation of switch 102 energizes a reset coil 103 which releases a spring-wound stepping relay 104, the latter being movable successively to the various positions indicated and effecting successive movement of the several parts as will now be described.

When reset coil 103 is initially energized by operation of the reset switch 102, the stepping relay 104 is returned to the #1 position illustrated in Fig. 14, and in this position of the stepping relay 104, relay 105 is actuated to deenergize the aforementioned brush hood motor 37 and permit the brush to lower, and to energize the brush motor 33 to rotate the brush, relay 106 is actuated to operate the catching hopper motor 46 to elevate the catching hopper, and relay 107 is actuated to energize the A. C. cleaning grid 28, at the same time opening the primary to the circuit of the D. C. charging grid 38 which is not operated during the downward cleaning movement of the carriage. The parts are now in position for the carriage to move downwardly to clean the plate and when the catching hopper 42 reaches its top position, it strikes the top limit switch 89, opening the circuit to the catching hopper motor 46. Operation of the limit switch 89 at the same time energizes the coil 103 on the stepping relay 104 and moves it to the #2 position.

In the #2 position of the stepping relay, relays 108 and 109 are actuated to start the carriage motor 79 and move the carriage downwardly, current being supplied to the motor through relay 109 while relay 108 governs the direction of movement of the motor, and at the same time, relay 111 is actuated for a purpose that will appear hereinafter while performing no function at this particular part of the cycle.

At this point, with the brush lowered and the A. C. grid energized if desirable, the carriage travels downwardly to clean the electrophotographic plate and upon reaching the bottom strikes the limit switch 88, deenergizing the relays 108, 109, 105, 107, and 111. This results in stopping the carriage motor 79, stops the brush motor 33, energizes the brush hood motor 37 to elevate the brush hood 34, and opens the circuit to the A. C. cleaning grid 28 through relay 107. At the same time, switch 88 energizes coil 112 to move the stepping relay to the #3 position.

In the #3 position of the stepping relay, relay 113 is actuated, breaking the circuit to the stepping relay coil 112 and closing the circuit to timer 114 which determines the period during which developer is discharged from the catching hopper into the developer hopper on the carriage, at the same time operating solenoid 58 which opens the gate 52 on the catching hopper to permit developer to fall into the developer hopper. When the timer 114 has completed its movement, it operates switch 115 to energize the indexing coil and move the stepping relay to its #4 position, at the same time deenergizing the catching hopper solenoid 58 to close the gate governing the discharge opening from the catching hopper.

In the #4 position of the stepping relay, relays 116 and 117 are actuated, relay 116 starting the carriage motor 79 to move the carriage upwardly and relay 117 operating to turn off the room light 118, the room light remaining off during the upward plate-charging movement of the carriage and during the subsequent developing downward movement of the carriage until the carriage reaches the bottom of its travel after development. As the carriage starts to move upwardly for charging the plate, the lower carriage limit switch 88 being released energizes the charging grid 38, at the same time deenergizing the stepping relay coil, and when the carriage reaches its top position and strikes limit switch 87, the latter upon movement energizes the coil to the stepping relay and moves the latter to its #5 position, in which position the relay 116 is deenergized to stop the carriage motor 79.

In the #5 position of the stepping relay, the relays 119 and 121 are actuated, relay 119 energizing the catching hopper motor 46 to move the catching hopper downwardly and relay 121 opening the circuit to the stepping relay coil, and when the catching hopper reaches its bottom position, it engages limit switch 91, deenergizing relays 119 and 121, stopping the catching hopper motor and closing the circuit to the stepping relay coil to move the latter to its #6 position.

When the stepping relay is in the #6 position, the timer 122 is energized, operating relay 123 and turning on the enlarger 92, at the same time opening the circuit to the stepping relay coil. When the timer 122 has completed its cycle, relay 123 is deenergized, turning off the enlarger, and again closing the stepping relay coil circuit to move the stepping relay to its #7 position.

When the stepping relay is in the #7 position, the timer 124 and relay 125 are operated, the latter energizing solenoid 26 which opens the gate controlling the discharge opening from the developer hopper to permit developer to be cascaded over the electrophotographic plate as the carriage travels downwardly and at the same time relay 126 is actuated to operate the stirring motor 77, relay 126 being held until relay 113 is operated. At the end of the cycle controlled by timer 124, the switch controlled thereby moves to operate relays 108 and 109 to move the carriage motor and effect downward travel of the carriage, and when the carriage reaches its lower position, it operates the limit switch 88, deenergizing relay 117 and turning on the room light 118. At the same time, the coil to the stepping relay is energized to move the stepping relay to its #8 position.

In the #8 position of the stepping relay, the timer 127 is energized, operating relay 128 which effects operation of the toner dispenser solenoids 73 for a predetermined period while the timer 127 is in operation.

This completes the automatic cycle, following which the carriage motor can be operated to move the carriage upwardly by the manual control switch 129, during which movement the powder image on the plate is transferred to a paper or other transfer sheet as already described.

131, 132 and 133 are parts of a switch which enable manual control of the electrical units connected thereto, 134 is a limit switch which stops the carriage motor when the carriage is moved upwardly beyond its normal limit switch 87, 135 is a relay which deenergizes the stepping relay coil when the reset switch is depressed, 136 is a motor to the blower forming part of the vacuum cleaning unit, 137 is a voltage regulator to the charging grid 38, 138 is the high voltage D. C. power supply, and 139 is a final limit switch for the carriage.

While the invention has been described with reference to the structure herein shown, it is not limited to the details disclosed and this application is intended to cover such modifications and departures as may come within the purposes of the improvements and the scope of the following claims.

We claim:

1. An electrophotographic microfilm enlarger comprising a vertically inclined plate support, an enlarger located above the plate support with its longitudinal axis perpendicular to the plane of the plate support and operating to project a microfilm image onto an electrophotographic plate mounted on said plate support, a carriage movable downwardly and upwardly over said plate support, plate-cleaning mechanism on the carriage, plate-charging mechanism on the carriage, image-developing mechanism including a developer hopper on the carriage having an outlet permitting cascading of developer over a plate on the plate support, electrically controlled means operatively associated with and acting automatically to move the carriage downwardly and upwardly over said plate support and to operate the plate-cleaning, plate-charging, and image-developing mechanisms successively, a catching hopper movable downwardly to a position beneath the lower end of said plate support or upwardly above said developer hopper, said catching hopper having an outlet, means acting automatically to open said outlet and permit discharge of developer from said catching hopper into said developer hopper when the catching hopper is located above the developer hopper and the latter is in its lowermost position, means controlled by the catching hopper acting to prevent movement of the carriage except when the catching hopper is in its top or bottom position, and means controlled by the carriage acting to prevent movement of the catching hopper except when the carriage is in its top position.

2. An electrophotographic microfilm enlarger comprising a vertically inclined electrophotographic plate support, an enlarger operating to project a microfilm image onto an electrophotographic plate mounted on said plate support, a carriage movable downwardly and upwardly over said plate support, a developer hopper located at the lower end of the carriage and having an outlet permitting cascading of developer over a plate on the plate support, a movable gate controlling said outlet, feed and transfer rolls on the carriage at the upper end thereof, one of said transfer rolls having driven pinions at its ends, stationary racks extending endwise of said plate support at the sides thereof, said driven pinions engaging said racks, plate-charging mechanism on the carriage adjacent to and below said feed and transfer rolls, and a rotatable cleaning brush mounted on the carriage between the developer hopper and said plate-charging mechanism.

3. An electrophotographic microfilm enlarger comprising a vertically inclined electrophotographic plate support, an enlarger operating to project a microfilm image onto an electrophotographic plate mounted on said plate support, a carriage movable downwardly and upwardly over said plate support, a developer hopper located at the lower end of the carriage and having an outlet permitting cascading of developer over a plate on the plate support, a movable gate controlling said outlet, feed and transfer rolls on the carriage at the upper end thereof, one of said transfer rolls having driven pinions at its ends, stationary racks extending endwise of said plate support at the sides thereof, said driven pinions engaging said racks, plate-charging mechanism on the carriage adjacent to and below said feed and transfer rolls, a rotatable cleaning brush mounted on the carriage between the developer hopper and said plate-charging mechanism, a catching hopper movable downwardly to a position beneath the lower end of said plate support or upwardly to a position above said developer hopper, said catching hopper having an outlet, a gate controlling said outlet, vertically arranged tracks, a frame on which the catching hopper is mounted, guide rollers mounted on the frame and travelling on said tracks, and electrically controlled means operating to raise or lower said frame.

4. An electrophotographic microfilm enlarger comprising a vertically inclined electrophotographic plate support, an enlarger operating to project a microfilm image onto an electrophotographic plate mounted on said plate support, a carriage movable downwardly and upwardly over said plate support, a developer hopper located at the lower end of the carriage and having an outlet permitting cascading of developer over a plate on the plate support, a movable gate controlling said outlet, feed and transfer rolls on the carriage at the upper end thereof, one of said transfer rolls having driven pinions at its ends, stationary racks extending endwise of said plate support at the sides thereof, said driven pinions engaging said racks, plate-charging mechanism on the carriage adjacent to and below said feed and transfer rolls, a rotatable cleaning brush mounted on the carriage between the developer hopper and said plate-charging mechanism, a reversible electric motor, and an endless chain operatively connected to said motor and to said carriage at one side of the latter.

5. An electrophotographic microfilm enlarger comprising a vertically inclined electrophotographic plate support, an enlarger operating to project a microfilm image onto an electrophotographic plate mounted on said plate support, a carriage movable downwardly and upwardly over said plate support, a developer hopper located at the lower end of the carriage and having an outlet permitting cascading of developer over a plate on the plate support, a movable gate controlling said outlet, feed and transfer rolls on the carriage at the upper end thereof, one of said transfer rolls having driven pinions at its ends, stationary racks extending endwise of said plate support at the sides thereof, said driven pinions engaging said racks, plate-charging mechanism on the carriage adjacent to and below said feed and transfer rolls, a rotatable cleaning brush mounted on the carriage between the developer hopper and said plate-charging mechanism, a reversible electric motor, an endless chain operatively connected to said motor and to said carriage at one side of the latter, a catching hopper movable downwardly to a position beneath the lower end of said plate support or upwardly to a position above said developer hopper, said catching hopper having an outlet, a gate controlling said outlet, vertically arranged tracks, a frame on which the catching hopper is mounted, guide rollers mounted on the frame and travelling on said tracks, and electrically controlled means operating to raise or lower said frame.

6. Electrophotographic mechanism comprising a vertically inclined stationary flat plate support, a carriage movable downwardly and upwardly over a stationary flat plate on said plate support, electrical controlling means operating automatically to move the carriage downwardly twice and upwardly once at each operation, electrical plate-charging mechanism on the carriage at the upper end thereof operating to charge the plate on the plate support during upward travel of the carriage in each said operation, a developer powder containing hopper on the carriage having an outlet at the lower end of the carriage through which developer powder is cascaded over the plate on the plate support during the second downward travel of the carriage in each said operation, a movable normally closed gate for said outlet, and time-controlled means operating to open said gate when the carriage is at the upper end of its travel.

7. An electrophotographic microfilm enlarger comprising a vertically inclined stationary flat plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over a flat plate on said plate support, electrical controlling means operating automatically to move the carriage downwardly twice and upwardly once at each operation, plate-cleaning mechanism on the carriage, electrical plate-charging mechanism on the carriage, a developer powder containing hopper on the carriage having an outlet at the lower end of the carriage through which developer powder is cascaded over the plate on the plate support, a movable normally closed gate for said outlet and time-controlled means operating to open said gate when the carriage is at the upper end of its travel.

8. An electrophotographic microfilm enlarger comprising a vertically inclined stationary flat plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over a flat plate on said plate support, electrical controlling means operating automatically to move the carriage downwardly twice and upwardly once at each operation, plate-cleaning mechanism on the carriage, electrical plate-charging mechanism on the carriage, a developer powder containing hopper on the carriage having an outlet at the lower end of the carriage through which developer powder is cascaded over the plate on the plate support, a movable normally closed gate for said outlet, time-controlled means operating to open said gate when the carriage is at the upper end of its travel, and paper feed and image transfer mechanism on the carriage at its upper end operated by upward movement of the carriage and acting to transfer an image from said plate to a transfer sheet, the plate-cleaning mechanism and plate-charging mechanism being located between the developer powder hopper and the paper feed and image transfer mechanism.

9. An electrophotographic microfilm enlarger comprising a vertically inclined stationary flat plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over a plate on said plate support, electrical controlling means operating automatically to move the carriage downwardly twice and upwardly once at each operation, plate-cleaning mechanism on the carriage, electrical plate-charging mechanism on the carriage, a developer powder hopper on the carriage at its lower end having an outlet through which developer is cascaded over the plate on the plate support, a movable normally closed gate for said outlet, time-controlled mechanism operating to open said gate when the carriage is at the upper end of its travel, and a catching hopper controlled by said carriage and electrical means and moving vertically between an uppermost position where it discharges developer into said developer hopper and a lowermost position where it receives developer cascaded down from said developer hopper over the plate on the plate support.

10. An electrophotographic microfilm enlarger comprising a vertically inclined stationary flat plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over the plate on said plate support, electrical controlling means operating automatically to move the carriage downwardly twice and upwardly once at each operation, plate-cleaning mechanism on the carriage, electrical plate-charging mechanism on the carriage, a developer powder hopper on the carriage at its lower end having an outlet through which developer is cascaded over the plate on the plate support, a movable normally closed gate for said outlet, time-controlled mechanism operating to open said gate when the carriage is at the upper end of its travel, paper feed and image transfer mechanism on the carriage operating to transfer an image from the plate to a transfer sheet, and a catching hopper controlled by said carriage and electrical means and moving vertically between an uppermost position where it discharges developer into said developer hopper and a lowermost position where it receives developer cascaded down from said developer hopper over the plate on the plate support.

11. An electrophotographic microfilm enlarger comprising a vertically inclined stationary flat plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over said plate support, electrical controlling means operating automatically to move the carriage twice downwardly and upwardly once at each operation, plate-cleaning mechanism on the carriage, electrical plate-charging mechanism on the carriage, and image-developing mechanism including a developer powder hopper at the lower end of the carriage having an outlet through which developer powder is cascaded over the plate on the plate support, a movable normally closed gate for said outlet, and time-controlled mechanism operating to open said gate when the carriage is at the upper end of its travel, said electrical controlling means actuating the plate-cleaning, plate-charging, and image-developing mechanisms successively.

12. An electrophotographic microfilm enlarger comprising a vertically inclined stationary flat plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over said plate support, electrical controlling means operating automatically to move the carriage twice downwardly and upwardly once at each operation, plate-cleaning mechanism on the carriage, electrical plate-charging mechanism on the carriage, image-developing mechanism including a developer powder hopper on the carriage having an outlet at its lower end through which developer is cascaded over the plate on the plate support, a movable normally closed gate for said outlet, time-controlled mechanism operating to open said gate when the carriage is at the upper end of its travel, said electrical controlling means actuating the plate-cleaning mechanism, plate-charging mechanism, and image-developing mechanisms successively, paper feed and image transfer mechanism on the carriage operated by upward movement of the carriage and acting to transfer an image from the plate to a transfer sheet, and manually controlled means operating the carriage upwardly to effect the image transfer operation, the plate-cleaning mechanism and plate-charging mechanism being located between the developer powder hopper and the paper feed and image transfer mechanism.

13. An electrophotographic microfilm enlarger comprising a vertically inclined stationary flat plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over said plate support, electrical controlling means operating automatically to move the carriage twice downwardly and upwardly once at each operation, plate-cleaning mechanism on the carriage, electrical plate-charging mechanism on the carriage, image-developing mechanism including a developer powder hopper at the lower end of the carriage having an outlet through which developer is cascaded over the plate on the plate support, a movable normally closed gate for said outlet, time-controlled mechanism operating to open said gate when the carriage is at the upper end of its travel, said electrical controlling means actuating the plate-cleaning, plate-charging, and image-developing mechanisms successively, a catching hopper controlled by said carriage and electrical means and moving downwardly from a position above said developer hopper to a position beneath the lower end of said plate support and acting to receive developer powder from the plate, said catching hopper having an outlet, a closure for said outlet, and means acting automatically to open said closure and permit discharge of developer from said catching hopper into said developer hopper when the catching hopper is located above the developer hopper and the latter is in its lowermost position.

14. An electrophotographic microfilm enlarger comprising a vertically inclined stationary flat plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over said plate support, electrical controlling means operating automatically to move the carriage downwardly twice and upwardly once at each operation, plate-cleaning mechanism on the carriage, electrical plate-charging mechanism on the carriage, image-developing mechanism including a developer hopper at the lower end of the carriage, having an outlet through which developer is cascaded over the plate on the plate support, a movable normally closed gate for said outlet, time-controlled means operating to open said gate when the carriage is at the upper end of its travel, said electrical controlling means actuating the plate-cleaning, plate-charging, and image-developing mechanisms successively, paper feed and image transfer mechanism at the upper end of the carriage controlled by upward movement of the carriage and acting to transfer an image from the plate to a transfer sheet, manually controlled means operating the carriage upwardly and thereby operating the paper feed and image transfer mechanism, a catching hopper controlled by said electrical means and moving downwardly from a position above said developer hopper to a position beneath the lower end of said plate support, said catching hopper having an outlet, a gate for said outlet and means acting automatically to open said gate and permit discharge of developer from said catching hopper into said developer hopper when the catching hopper is above the developer hopper and the latter is in its lowermost position.

15. An electrophotographic microfilm enlarger comprising a vertically inclined stationary flat plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over said plate support, electrical controlling means operating automatically to move the carriage downwardly twice and upwardly once at each operation, plate-cleaning mechanism on the carriage, electrical plate-charging mechanism on the carriage, image-developing mechanism including a developer powder hopper at the lower end of the carriage having an outlet through which developer is cascaded over the plate on the plate support, a movable normally closed gate for said outlet, time-controlled means operating to open said gate when the carriage is at the upper end of its travel, said electrical controlling means actuating the plate-cleaning, plate-charging, and image-developing mechanisms successively, paper feed and image transfer mechanism on the carriage controlled by upward movement of the carriage and operating to transfer an image from the plate to a transfer sheet, manually controlled means operating to move the carriage upwardly thereby effecting transfer of the image from the plate to the transfer sheet, a catching hopper controlled by said electrical means and moving downwardly from a position above said developer hopper to a position beneath the lower end of said plate support, said catching hopper having an outlet, a gate for said outlet, means acting automatically to open said gate and permit discharge of developer from said catching hopper into said developer hopper when the catching hopper is located above the developer hopper and the latter is in its lowermost position, means controlled by the catching hopper acting to prevent movement of the carriage except when the catching hopper is in its uppermost or lowermost positions, and means controlled by the carriage acting to prevent movement of the catching hopper except when the carriage is in its top position.

16. An electrophotographic microfilm enlarger comprising a vertically inclined stationary flat plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over said plate support, electrical controlling means acting automatically to move the carriage downwardly twice and upwardly once at each operation, image-developing mechanism including a developer hopper located at the lower end of the carriage and having an outlet through which developer is cascaded over the plate on the plate support, a movable gate controlling said outlet, time-controlled means acting automatically to open said gate as the carriage starts its second travel downwardly, paper feed and image transfer rolls at the upper end of the carriage, electrical plate-charging mechanism on the carriage adjacent to and below said feed and transfer rolls, a rotatable cleaning brush mounted on the carriage between the developer hopper and said plate-charging mechanism, said electrical controlling means acting automatically to move the brush toward the plate before the carriage starts its initial downward travel and actuating the plate-cleaning, plate-charging, and image developing mechanisms successively.

17. An electrophotographic microfilm enlarger comprising a vertically inclined stationary flat electrophotographic plate support, an enlarger located above the plate support with its longitudinal axis perpendicular to the plane of the plate support and operating to project a microfilm image onto a flat stationary electrophotographic plate mounted on said plate support, a carriage movable downwardly and upwardly over said plate support, electrical controlling means operating automatically to move the carriage downwardly twice and upwardly once at each operation, image-developing mechanism including a developer hopper located at the lower end of the carriage and having an outlet through which developer is cascaded over the plate on the plate support, a movable gate controlling said outlet, time-controlled means acting automatically to open said gate as the carriage starts its second travel downwardly, paper feed and image transfer rolls on the carriage at the upper end thereof, electrical plate-charging mechanism on the carriage adjacent to and below said paper feed and image transfer rolls, a rotatable cleaning brush mounted on the carriage between the developer hopper and said electrical plate-charging mechanism, said electrical controlling means acting automatically to move the brush toward the plate before the carriage starts its initial downward travel and away from the plate support after the carriage completes its initial downward travel and to operate the plate-cleaning, plate-charging, and image-developing mechanisms successively, a catching hopper movable downwardly to a position beneath the lower end of said plate support or upwardly above said developer hopper, said catching hopper having an outlet, a gate controlling said outlet, said electrical controlling means acting automatically to open said gate when the catching hopper is in its uppermost position and the developer hopper is in its lowermost position after completion of its downward cleaning travel and prior to its upward charging travel, a stirrer at the bottom of the catching hopper, said electrical means acting automatically to operate the stirrer when the catching hopper is in its lowermost position, and a toner discharger in the hopper above said stirrer, said electrical means acting automatically to operate said toner discharger for a predetermined time upon completion of the image-developing travel of the carriage.

18. An electrophographic microfilm enlarger comprising a vertically inclined stationary flat electrophotographic plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over said plate support, electrical controlling means acting automatically to move the carriage downwardly twice and upwardly once at each operation, image-developing mechanism including a developer hopper located at the lower end of the carriage and having an outlet through which developer is cascaded over the plate on the plate support, a movable gate controlling said outlet, time-controlled means acting automatically to open said gate as the carriage starts its second travel downwardly, paper feed and image transfer rolls on the carriage at the upper end thereof, electrical plate-charging mechanism on the carriage adjacent to and below said feed and transfer rolls, a rotatable cleaning brush mounted on the carriage between the developer hopper and said plate-charging mechanism, said electrical controlling means acting automatically to move the brush toward the plate before the carriage starts its initial downward travel and away from the plate after the carriage completes its initial downward travel and operating the plate-cleaning, plate-charging, and image developing mechanisms successively, a catching hopper movable downwardly to a position beneath the lower end of said plate support or upwardly above said developer hopper, said catching hopper having an outlet, a gate controlling said outlet, said electrical controlling means acting automatically to open said gate when the catching hopper is in its uppermost position and the developer hopper is in its lowermost position after completion of the downward cleaning travel of the carriage and prior to its upward charging travel, a stirrer at the bottom of the catching hopper, said electrical controlling means acting automatically to operate the stirrer when the catching hopper is in its lowermost position, a toner discharger in the catching hopper above said stirrer, said electrical controlling means acting automatically to operate said toner discharger for a predetermined time upon completion of the image-developing travel of the carriage, means controlled by the catching hopper acting to prevent movement of the carriage except when the hopper is in its uppermost or lowermost position, and means controlled by the carriage acting to prevent movement of the catching hopper except when the carriage is in its top position.

19. An electrophotographic microfilm enlarger comprising a vertically inclined stationary flat electrophotographic plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over said plate support, electrical controlling means acting automatically to move the carriage downwardly twice and upwardly once at each operation, plate-cleaning mechanism on the carriage, electrical plate-charging mechanism on the carriage, image-developing mechanism including a developer hopper at the lower end of the carriage having an outlet through which developer is cascaded over the plate on the plate support, a movable normally closed gate for said outlet, time-controlled means operating to open said gate when the carriage is at the upper end of its travel, said electrical controlling means actuating the plate-cleaning, plate-charging, and image-developing mechanisms successively, a catching hopper movable downwardly to a position beneath the lower end of said plate support or upwardly to a position above said developer hopper, said catching hopper having an outlet, a gate for said outlet, said electrical controlling means acting automatically to open said gate and permit discharge of developer from said catching hopper into said developer hopper when the catching hopper is located above the developer hopper and the latter is in its lowermost position, a deflector pivotally mounted on the catching hopper and moving out of the path of the carriage when the latter travels downwardly, and a guide plate pivotally mounted at the lower end of the plate support, said guide plate extending from the lower end of the plate support to a point above the catching hopper and moving out of the path of the catching hopper when the latter travels upwardly.

20. An electrophotographic microfilm enlarger comprising a vertically inclined stationary flat electrophotographic plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over said plate support, electrical controlling means acting automatically to move the carriage downwardly twice and upwardly once at each operation, electrical plate-charging mechanism on the carriage, and image-developing mechanism including a developer hopper at the lower end of the carriage having an outlet through which developer powder is cascaded over the plate on the plate support, said electrical controlling means operating the carriage upwardly to charge a plate on the plate support and thereafter moving the carriage downwardly to cascade developer over the plate and thereby develop an image on the plate.

21. An electrophotographic microfilm enlarger comprising a vertically inclined stationary flat electrophotographic plate support, an enlarger located above the plate support with its longitudinal axis perpendicular to the plane of the plate support and operating to project a microfilm image onto a stationary flat electrophotographic plate mounted on said plate support, a carriage movable downwardly and upwardly over said plate support, electrical controlling means acting automatically to move the carriage downwardly twice and upwardly once at each operation, electrical plate-charging mechanism on the carriage, image-developing mechanism including a developer hopper at the lower end of the carriage having an outlet through which developer is cascaded over a plate on the plate support, a movable normally closed gate for said outlet, time-controlled means operating to open said gate when the carriage is at the upper end of its travel, and a catching hopper movable downwardly to a position beneath said developer hopper or upwardly to a position above said developer hopper, said electrical controlling means acting automatically to successively move the catching hopper to its uppermost position and supply developer to the developer hopper, move the carriage upwardly and charge a plate on the plate support, move the catching hopper downwardly to its lowermost position, and move the carriage downwardly and cascade developer over a plate on the plate support, thereby developing an image on the plate.

22. An electrophotographic apparatus including an electrophotographic plate support means having a substantially flat surface for supporting a flat electrophotographic plate in a stationary position, image projecting means operatively positioned with respect to said plate support means for projecting an image onto an electrophotographic plate insertable on said plate support means, carriage means operatively connected to said plate support means for movement in a plane parallel to the flat surface of said plate support means, said carriage means including a plate charging means, a developer supply hopper means having an outlet passage thereon and a movable normally closed gate for said outlet passage for cascading a supply of developer powder on an electrophotographic plate and feed transfer means for positioning a sheet of transfer material in contact with an electrophotographic plate, means operatively connected to said carriage for moving the carriage means over said plate support means, and means operatively connected to said plate charging means, said image projecting means, said movable normally closed gate on said developer supply hopper means, and said feed transfer means for sequentially charging an electrophotographic plate, projecting an image thereon, cascading a developer powder on the plate to develop the image and to position a sheet of transfer material in contact with the plate for transferring the image thereto.

References Cited in the file of this patent

UNITED STATES PATENTS

| | | |
|---|---|---|
| 1,710,059 | Lipsius | Apr. 23, 1929 |
| 1,763,734 | Whittaker | June 17, 1930 |
| 2,027,307 | Schacht | Jan. 7, 1936 |
| 2,221,776 | Carlson | Nov. 19, 1940 |
| 2,297,691 | Carlson | Oct. 6, 1942 |
| 2,357,809 | Carlson | Sept. 12, 1944 |
| 2,421,210 | Louft | May 27, 1947 |
| 2,473,729 | Salz | June 21, 1949 |
| 2,495,528 | Langan | Jan. 24, 1950 |
| 2,539,084 | Keeley et al. | Jan. 23, 1951 |
| 2,600,580 | Sabel et al. | June 17, 1952 |
| 2,684,902 | Mayo et al. | July 27, 1954 |
| 2,703,280 | Butterfield et al. | Mar. 1, 1955 |
| 2,705,199 | Clark | Mar. 29, 1955 |